United States Patent
Nagano (10) Patent No.: US 6,339,456 B1
(45) Date of Patent: Jan. 15, 2002

(54) ACTIVE MATRIX LIQUID CRYSTAL DISPLAY APPARATUS WITH PARASITIC CAPACITANCE FLUCTUATION CORRECTION

(75) Inventor: Shingo Nagano, Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/268,729

(22) Filed: Mar. 17, 1999

(30) Foreign Application Priority Data

Mar. 31, 1998 (JP) ............................................. 10-085960

(51) Int. Cl.[7] .............................................. G02F 1/136
(52) U.S. Cl. ........................................... 349/42; 349/43
(58) Field of Search ............................. 349/42, 43, 46; 257/54, 72

(56) References Cited

U.S. PATENT DOCUMENTS

| | | | |
|---|---|---|---|
| 4,762,398 A | * | 8/1988 | Yasui et al. |
| 4,783,147 A | * | 11/1988 | Maurice et al. |
| 5,414,283 A | * | 5/1995 | Den Boer et al. ............ 257/59 |
| 5,535,028 A | * | 7/1996 | Bae et al. |
| 5,656,824 A | * | 8/1997 | Den Boer et al. ............ 257/59 |
| 5,875,009 A | * | 2/1999 | Shibahara ..................... 349/43 |
| 5,877,512 A | * | 3/1999 | Kim |
| 5,897,182 A | * | 4/1999 | Miyawaki .................... 349/43 |

* cited by examiner

*Primary Examiner*—Kenneth Parker
(74) *Attorney, Agent, or Firm*—Oblon, Spivak, McClelland, Maier & Neustadt, P.C.

(57) ABSTRACT

The present invention discloses a liquid crystal display apparatus comprising: a first pixel including a gate electrode extended forming a predetermined angle θ to the scanning line; a drain electrode provided having a portion to be superposed on the gate electrode in a first predetermined region on the signal line side in the gate electrode; a source electrode provided in a second predetermined region opposite to the drain electrode in the gate electrode; a second pixel including a gate electrode extended forming the predetermined angle θ to the scanning line; a source electrode provided having a portion to be superposed on the gate electrode in a third predetermined region on the scanning line side in the gate electrode; and a drain electrode provided in a fourth predetermined region opposite to the source in the gate electrode.

9 Claims, 8 Drawing Sheets

ACTIVE MATRIX LIQUID CRYSTAL DISPLAY APPARATUS WITH PARASITIC CAPACITANCE FLUCTUATION CORRECTION

BACKGROUND OF THE INVENTION

The present invention relates to an active matrix liquid crystal display apparatus using a TFT (thin film transistor) as a switching element.

The active matrix liquid crystal display apparatus, which has a switching element provided for each pixel, can obtain clear images free from the cross talk in high contrast, because display signals can be selectively applied upon each pixel. It is widely used as the display of a liquid crystal display apparatus for a portable unit such as note type personal computer or the like, considering the features of the light weight, thinner type, and lower power consumption.

Figure 7A:
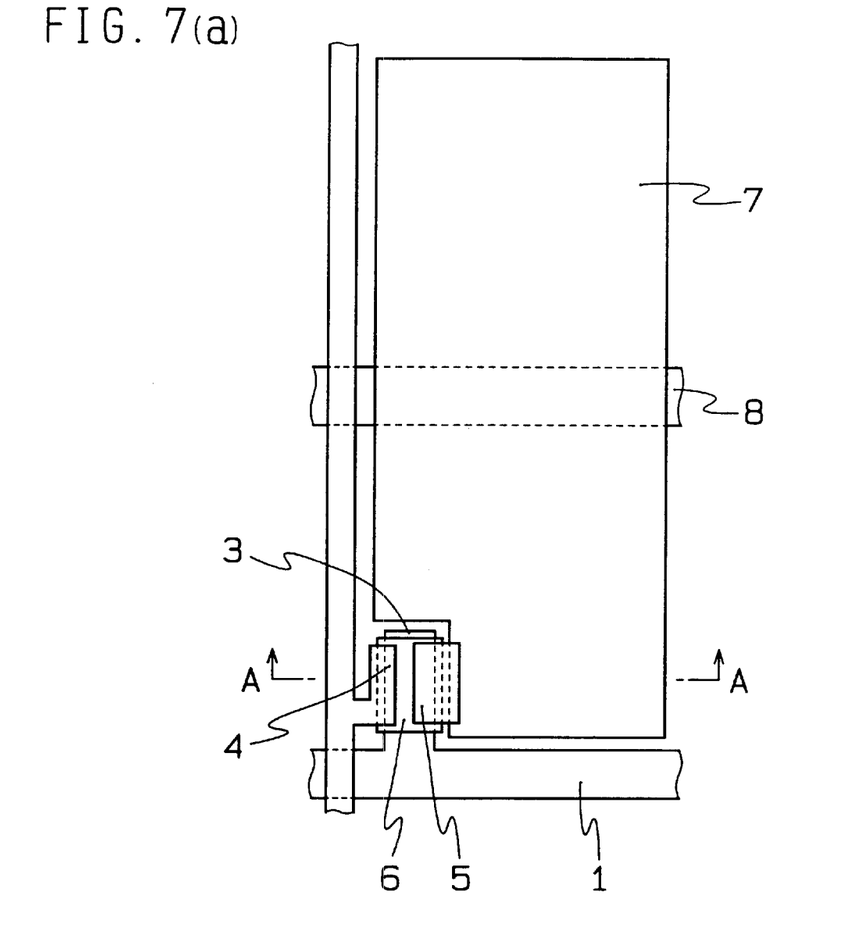
FIGS. 7(a) and 7(b) are a plan explanatory view and a sectional explanatory view of one example of the conventional pixel.
Figure 7B:
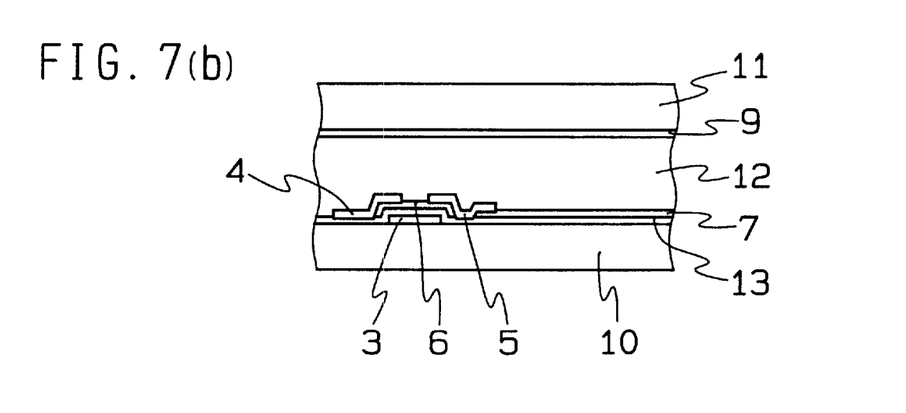

FIGS. 7 (a) and (b) show a plan explanatory view (FIG. 7 (a)) and a sectional explanatory view (FIG. 7 (b)) seen from an arrow mark direction, taken along a line A—A of the plan view (FIG. 7 (a)) in one example of the pixel of the conventional active matrix liquid crystal display apparatus. As shown in the drawings, the pixels are formed, by repeating a step of depositting/paterning, respectively a gate electrode 3 integrated with a scanning line 1, a gate insulating film 13, a semiconductor layer 6, a pixel electrode 7, a source electrode 4 integrated with a signal line 2, and a drain electrode 5 on a glass substrate 10. A common electrode 9 is formed on a counter glass substrate 11, and is positioned opposite to the glass substrate 10 through the liquid crystal layer 12. As shown in the plan view (FIG. 7 (a)), a storage capacitance line 8 is positioned parallel to the scanning line 1, and the storage capacitance is formed between the storage capacitance line 8 and the pixel electrode 7. the storage capacitance is inserted in parallel to the liquid crystal capacitance to be formed through the liquid crystal layer 12 between the pixel electrode 7 and the common electrode 9, and controls the leaking current of the TFT in a storage period, and the fluctuations, in the liquid crystal applying voltage, to be caused by forming the capacitance between the pixel electrode 7 and the other electrode. The displaying region is formed by the arrayed connection of pixel of the same configuration as described above.

Figure 8:
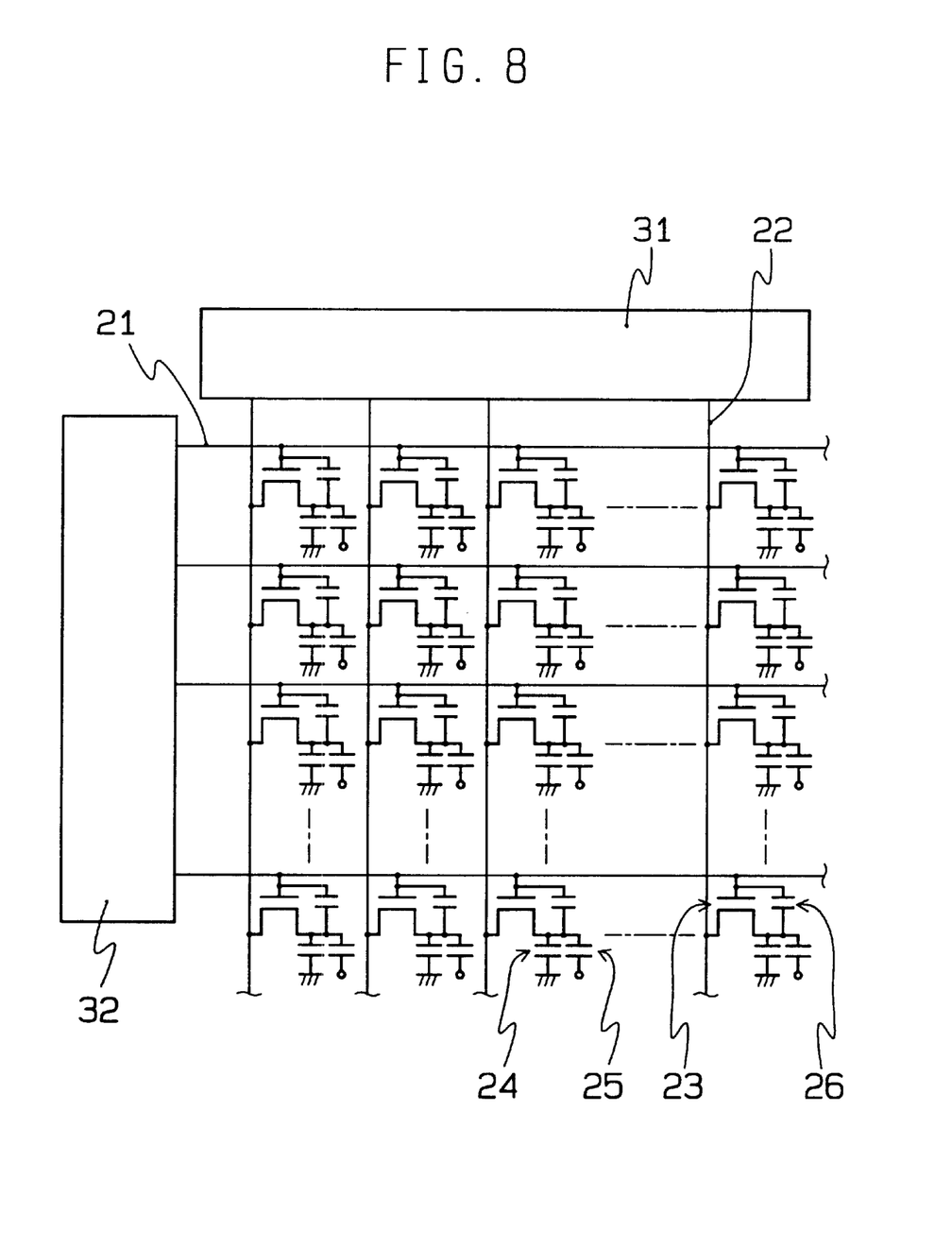
FIG. 8 is an explanatory view of the conventional principle of driving active matrix liquid crystal display apparatus.
Figure 9:
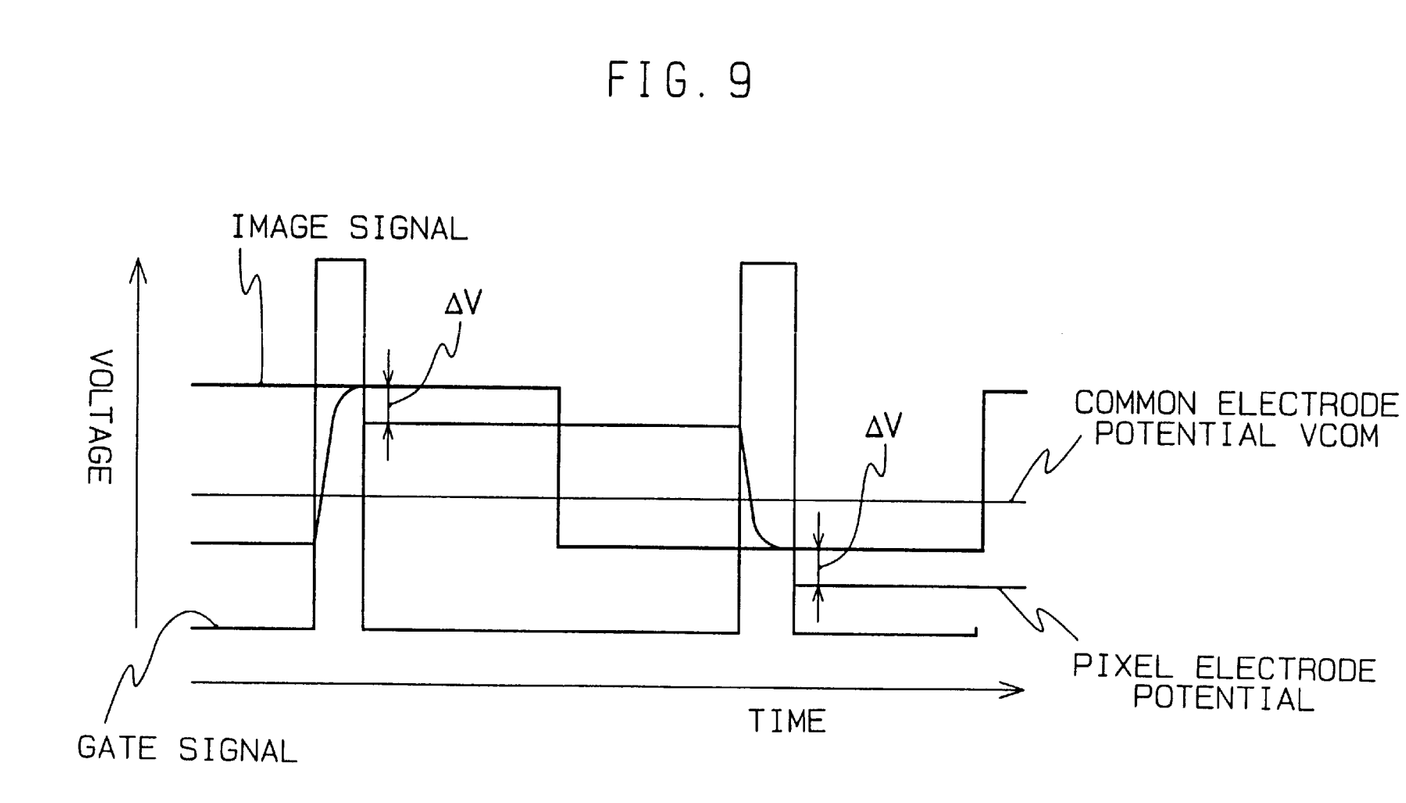
FIG. 9 is an explanatory view showing one example of the voltage wave shape to be used in the conventional active matrix liquid crystal display apparatus.

FIG. 8 is an explanatory view showing an equivalent circuit for an active matrix liquid crystal display apparatus when a TFT is used as a switching element. FIG. 9 is an explanatory view showing the driving waveform. The principle of the driving will be described briefly. A liquid crystal capacitance 25 is connected with a storage capacitance 24 through the TFT 23 at each intersection point between the signal line 22 and the scanning line 21. The parasitic capacitance Cgd 26 to be formed between the gate electrode and the drain electrode is added to the TFT. The scanning circuit 32 applies a gate pulse sequentially to the scanning line, and the signal generating circuit 31 outputs one line portion of image signals to the signal line synchronously. The TFT is made to be "ON" while the gate pulses are applied on the scanning line, and there is charged with the electric charge on the pixel capacitance and the storage capacitance in accordance with the image signals to be outputted to the signal line. When the gate pulse moves to the next scanning line, the TFT turns is made to be "OFF", and the charge accumulated before the gate pulses are applied is retained. As a result, the individual pixel effects the predetermined display independently.

In the active matrix liquid crystal display apparatus using the TFT as the switching element, the capacitance Cgd formed between the gate electrode and the drain electrode is parasitically formed. The Cgd is caused by forming the capacitance when the gate pulse falls, and the shift value ΔV of the pixel electrode potential is expressed by the following equation 1.

$$\Delta V = \frac{Cgd}{Clc + Cs + Cgd} \times \Delta Vg \qquad \text{(equation 1)}$$

wherein the Cgd is a parasitic capacitance between the gate/drain electrodes, Clc is a liquid crystal capacitance, Cs is an auxiliary capacitance, and ΔVg is the width of the gate pulse. In this equation, the ΔV can be substantially canceled by adjusting the common electrode potential Vcom when the ΔV is the same among all the pixel elements within the displaying region. But it is difficult to make the ΔV constant within the displaying region because of alignment errors of a step and repeat aligner (hereinafter referred to as stepper) to be used in a photolithography process at the pixel array formation. When the alignment error is caused, the difference is caused in the superposed amount of each layer in the divided exposure region, and the Cgd becomes different between the divided exposure regions. A condition where the ΔV becomes different between the divided exposure regions. As the distribution of the ΔV is reflected as it is in the distribution of the liquid crystal application voltage, thus causing the brilliance difference between the divided exposure regions.

As a solving method of this problem, it is considered to control the fluctuations of the ΔV by increasing the value of the storage capacitance Cs. Since the storage capacitance Cs is formed normally by the metallic film which does not have light transmittance, the pixel aperture ratio is reduced by increasing the size of the metallic film for increasing the value of the storage capacitance Cs. Although the Cgd itself is made smaller by downsizing the TFT, the smaller size of the TFT reduces the driving performance to decrease the degree of the freedom.

An object of the present invention is to provide a liquid crystal display apparatus which can control the brilliance difference among the divided exposure regions to be caused when the alignment error by the stepper is caused without reduction in the pixel aperture, and is superior in the display quality.

A liquid crystal display apparatus of claim 1 of the present invention comprises a first pixel including a gate electrode extended forming a predetermined angle θ to the scanning line;

a drain electrode provided having a portion to be superposed on the gate electrode in a first predetermined region on the signal line side in the gate electrode;

a source electrode provided in a second predetermined region opposite to the drain electrode in the gate electrode;

a second pixel including a gate electrode extended forming the predetermined angle θ to the scanning line;

a source electrode provided having a portion to be superposed on the gate electrode in a third predetermined region on the signal line side in the gate electrode; and a drain electrode provided in a fourth predetermined region opposite to the source electrode in the gate electrode.

In the liquid crystal display apparatus of the claim 2 of the present invention, the first predetermined region is controlled by the gate electrode and the signal line, the second predetermined region is controlled by the gate electrode and the scanning line, the third predetermined region is controlled by the gate electrode and the signal line, and the fourth predetermined region is controlled by the gate electrode and the scanning line.

The liquid crystal display apparatus of the claim 3 of the present invention, the first pixel and the second pixel are adjacent to each other and the first pixel and the second pixel are positioned by plurality in the arrayed condition.

In a liquid crystal display apparatus of the claim 4 of the present invention, the area of the portion where the gate electrode and the drain electrode are superposed in the first pixel is the same as that of the portion where the gate electrode and the drain electrode are superposed in the second pixel.

In a liquid crystal display apparatus of the claim 5 of the present invention, the value of Cgd in the first pixel is the same as that of the Cgd in the second pixel.

In a liquid crystal display apparatus of the claim 6 of the present invention, the storage capacitance is formed by the pixel electrode and the gate electrode to be included in the first pixel, and the storage capacitance is formed by the second pixel and the electrode gate electrode to be included the second pixel.

A liquid crystal display apparatus of the claim 7 of the present invention comprises a first pixel wherein a gate electrode extended forming a predetermined angle θ to the scanning line; said first pixel including a drain electrode being extended from the signal line side in the gate electrode, said drain electrode having a first superposing portion to be superposed on the one portion of the gate electrode; and a source electrode being extended from the scanning line side in the gate electrode, said source electrode second superposing portion to be superposed on the one portion of the gate electrode, said first superposing portion and said second superposing portion being formed point-symmetrical in one point on the central line of the gate electrode in the direction of the predetermined angle θ; and a second pixel wherein a gate electrode is extended forming a predetermined angle θ to the scanning line; said second pixel including a drain electrode being extended from the scanning line side in the gate electrode, said drain electrode having a third superposing portion to be superposed on one portion of the gate electrode; and a source electrode is extended from the signal line side in the gate electrode; said source electrode having a fourth superposing portion to be superposed on one portion of the gate electrode; said third superposing portion and said fourth superposing portion being formed in such a manner as to be point-symmetrical to each other with respect to a point on the central line of the gate electrode in the direction of the predetermined angle θ.

DETAILED DESCRIPTION

Embodiments of the liquid crystal display apparatus of the present invention will now be explained.

EMBODIMENT 1

Figure 1:
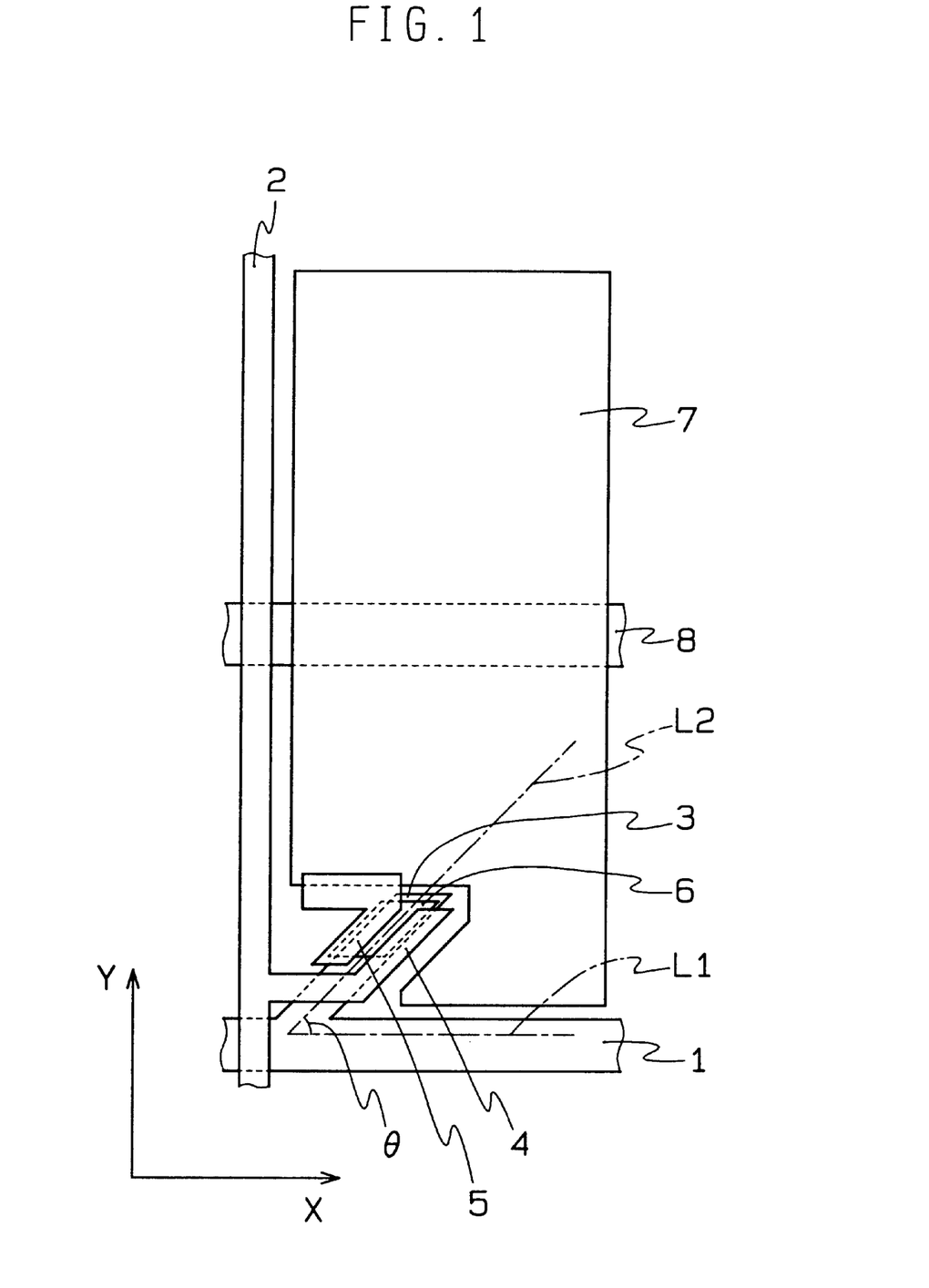
FIG. 1 is a plan explanatory view of a pixel portion in one embodiment of the present invention.
Figure 2:
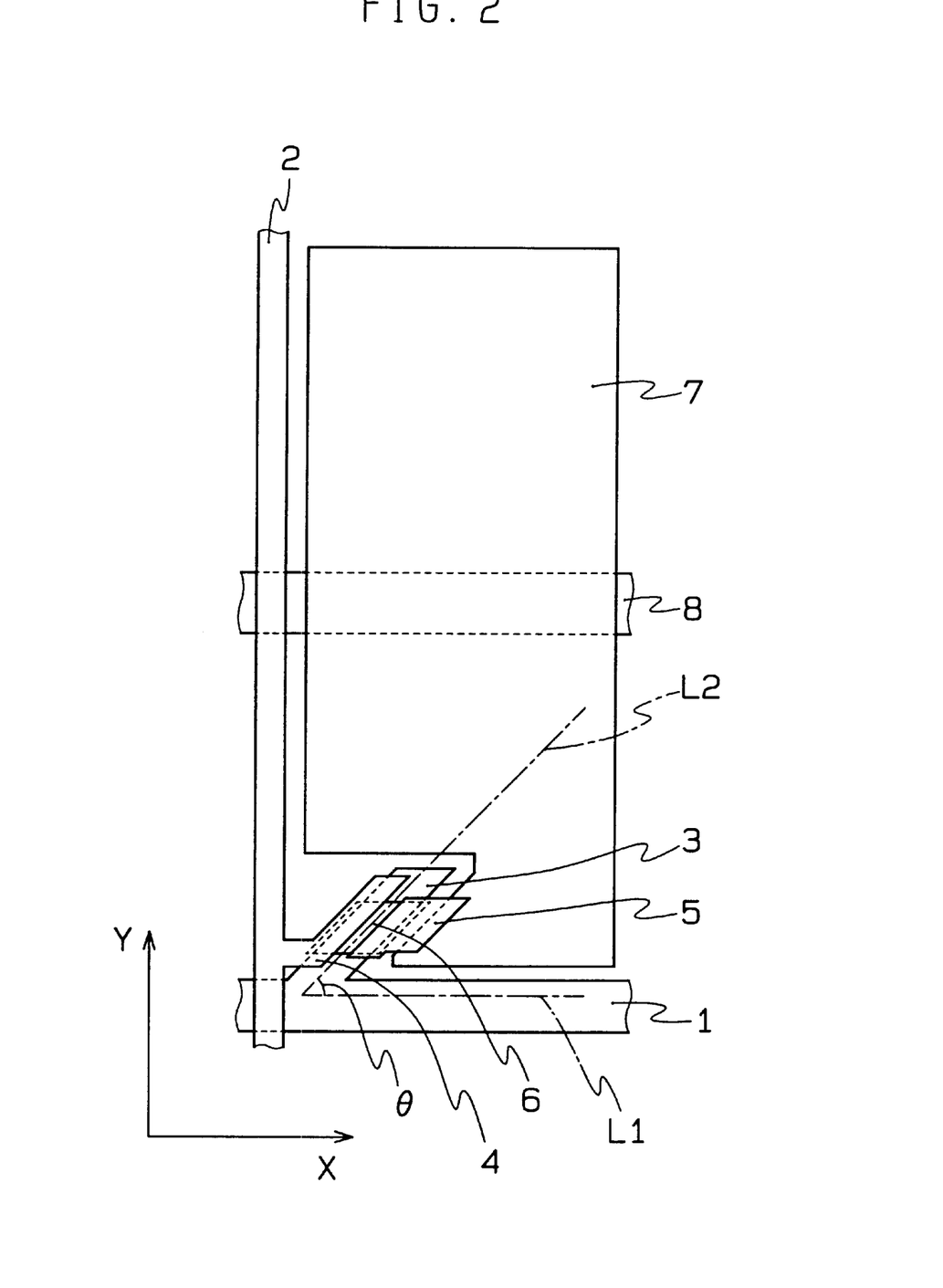
FIG. 2 is a plan explanatory view of a pixel portion in one embodiment of the present invention.

FIG. 1 and FIG. 2 are plan explanatory views showing a pixel in the embodiment 1 of the present invention. In the first pixel A shown in FIG. 1, the gate electrode 3 of the TFT is extended in the direction of a proper angle θ to the scanning line 1 when an angle formed with segments L1 and L2 is expressed. As shown in FIG. 1, after an insulating film and a semiconductor layer 6 are formed on the gate electrode, a drain electrode 5 is provided in a first predetermined region on the side of the signal line 2 in the gate electrode, a source electrode 4 is provided in a second predetermined region on the side opposite to the drain electrode in the gate electrode, so as to constitute the TFT. In the second pixel B shown in FIG. 2, the gate electrode 3 of the TFT is positioned with an angle θ the same as that of the first pixel A to the scanning line 1 when an angle formed with the segments L1 and L2 is expressed θ as in FIG. 1. After the insulating film and the semiconductor film 6 are formed on the gate electrode, a source electrode 4 is provided in a third predetermined region on the side of the signal line 2 in the gate electrode, and a drain electrode 5 is provided in a fourth predetermined region opposite to the source electrode in the gate electrode, so as to constitute the TFT. The superposed area of the gate electrode 1 and the drain electrode 5 is the same in the first and second pixels A and B, and the superposed portion shape is also the same. The first and second pixels A and B are reversed in the position of the each drain electrode, with the value of the Cgd being the same, and the superposed portion shape between the drain electrode and the gate electrode being the same.

Figure 3:
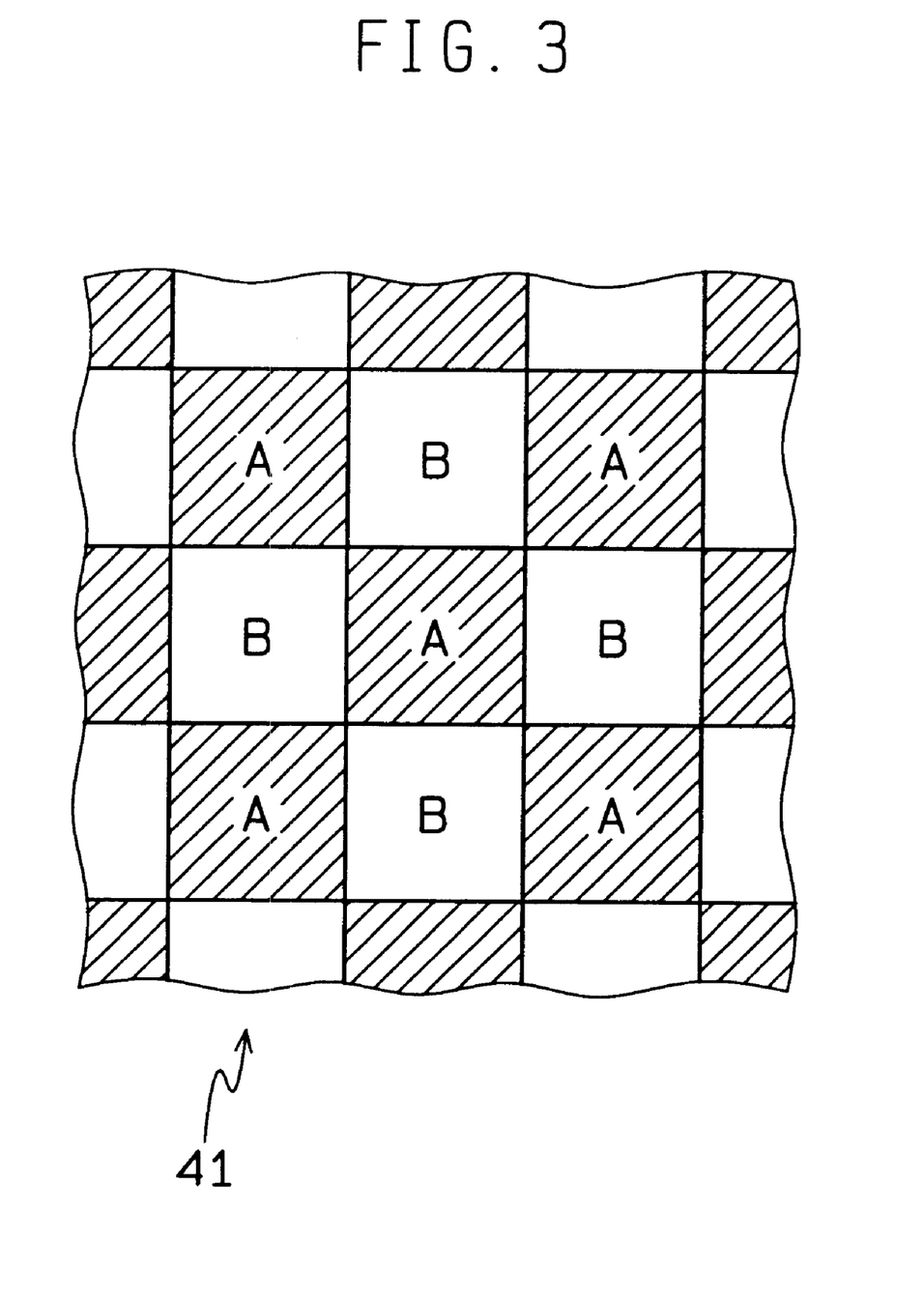
FIG. 3 is a schematic explanatory view showing the pixel arrangement on the array substrate in one embodiment of the present invention.

FIG. 3 is an explanatory view showing the array arrangement 41 of the pixels for composing the displaying region of the present embodiment 1. In the display region in the present embodiment as shown in the drawing, the first pixel A and the second pixel B are alternately arranged in both the scanning line direction and the signal line direction.

When the superposing area between the gate electrode and the source electrode, and the superposing area between the gate electrode and the drain electrode changes respectively, the changes influence the fluctuations in the Cgd badly. The fluctuations in the superposing area of the electrodes cause the alignment errors of the stepper. A case where the fluctuations have been caused will be described. For example, when the source electrode and the drain electrode are offset in the X direction shown in FIG. 1 to the gate electrode, the Cgd is reduced in the first pixel A, and the Cgd increases in the second pixel B. When the Cgd is offset in the Y direction, the Cgd is reduced in the first pixel A, and the Cgd is increased in the second pixel B. When the alignment error of the stepper is caused, the increase and the decrease of the Cgd in the adjacent pixel within the displaying region is caused in the opposite direction. Since the value of the Cgd, and the superposing portion shape between the gate electrode for forming the Cgd and the drain electrode are made the same, the increase and decrease amount of the Cgd to the offset amount becomes the same.

Figure 4:
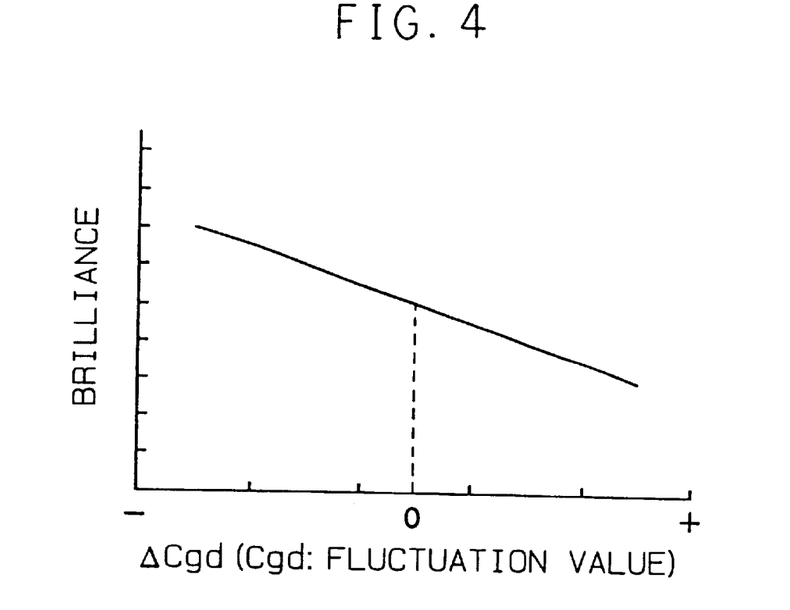
FIG. 4 is an explanatory view for explaining the relationship between the fluctuations and the brilliance of the Cgd in one embodiment of the present invention.
Figure 5:
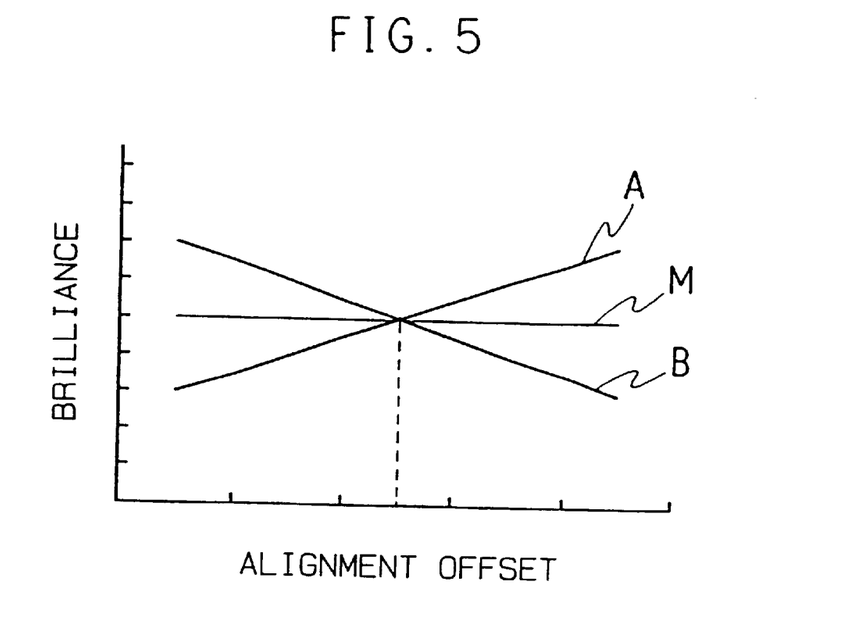
FIG. 5 is an explanatory view of the relationship between the alignment offset and the brilliance in one embodiment of the present invention.

FIG. 4 is an explanatory view showing the relationship between the Cgd fluctuation ($\Delta V$ fluctuation) and the brilliance about 20 through 40% in transmittance which is largest in brilliance change to the voltage change. As shown in the drawing, the brilliance increases (upward direction in the drawing) to the increase of the Cgd (right direction in the drawing), the brilliance shows the decreasing tendency to the decrease in the Cgd, and the brilliance change amount is almost constant to the change amount of the Cgd, thus resulting in the brilliance change to the alignment offset amount of the first pixel A and the second pixel B as shown in FIG. 4. FIG. 5 is an explanatory view showing the relationship between the alignment offset and the brilliance. The brilliance change of the adjacent pixel is caused in the same size in the opposite direction, and he brilliance in a certain region hardly changes, because the brilliance becomes average M between the first pixel A shown in the drawing A, and the second pixel B in the drawing B.

Even when the alignment offset of the stepper is caused by using this embodiment, the brilliance as the region to be formed by a plurality of pixels hardly changes as compared with a case where the alignment offset is not caused. It can be controlled that the brilliance difference between the divided exposure regions is caused, whereby the liquid crystal display apparatus which is superior in the display quality can be obtained without reduction in the pixel aperture ratio.

EMBODIMENT 2

Figure 6A:
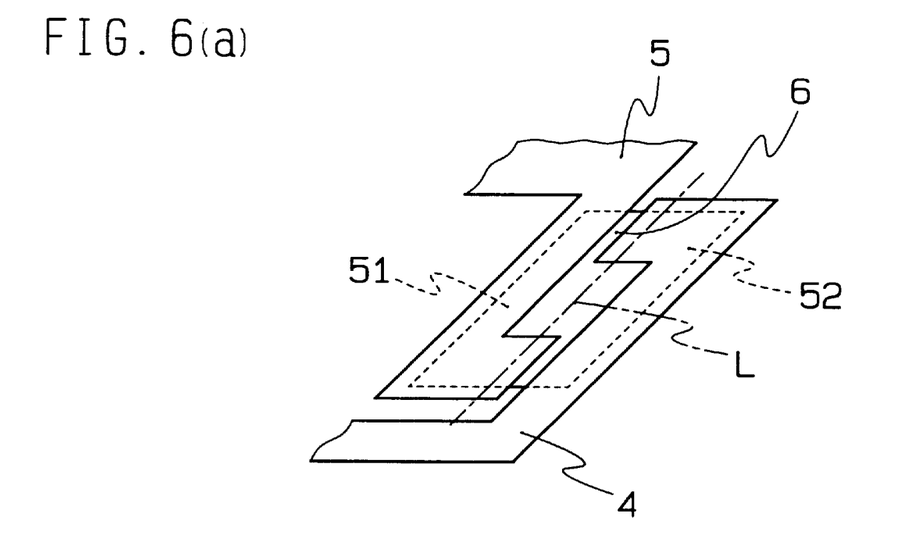
FIG. 6(a) and 6(b) each is a plan explanatory view of the pixel portion on another embodiment f the present invention.
Figure 6B:
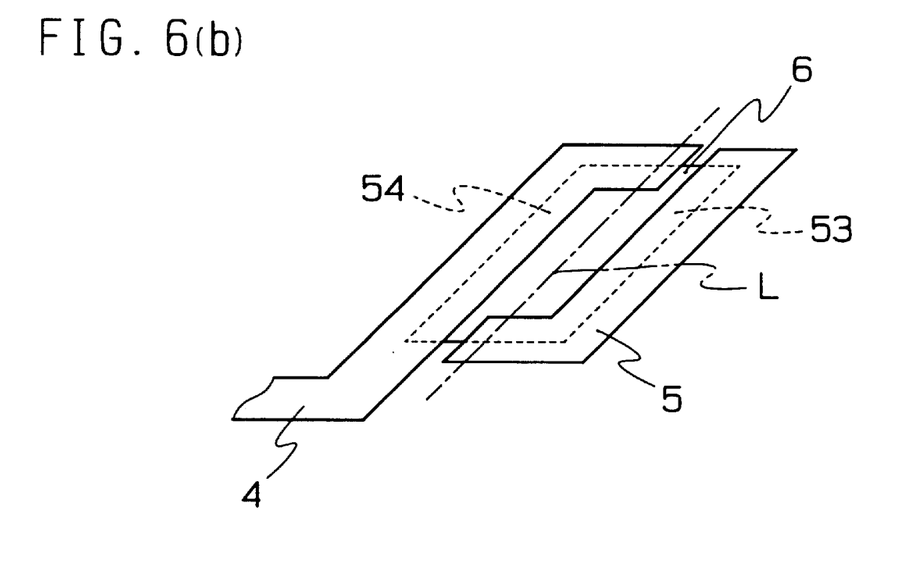

FIGS. 6(a) and 6(b) are plan explanatory views of the pixel portion of another embodiment of the present invention. Referring to FIG. 5, the same reference numerals are given to the same elements shown in FIG. 1 and FIG. 2. As shown in FIGS. 6(a) and 6(b), in this embodiment, one portion of the drain electrode is extended onto the side of the source electrode, and one portion of the source electrode 4 is extended onto the side of the drain electrode 5. The other points are the same as those of Embodiment 1. Namely, this embodiment is the same as Embodiment 1 in that the gate electrode extended so that a predetermined segment L forms an angle $\theta$ (not shown) to the scanning line (not shown), the drain electrode and the source electrode are provided. As shown in FIG. 6(a), in this embodiment, in the first pixel, the drain electrode 5 is extended from the signal line side in the gate electrode, having the first superposing portion 51 to be superposed on one portion of the gate electrode (the lower layer of the semiconductor layer 6, not shown), and at the same time, the source electrode 4 is extended from the scanning line side in the gate electrode, having the second superposing portion 52 to be superposed on one portion of the gate electrode, and the first superposing portion and the second superposing portion are formed in such a manner as to be point-symmetrical to each other with respect to a point on the central line (the segment L) of the gate electrode in the predetermined angle $\theta$ direction. As shown in FIG. 6(b), the second pixel is the same as Embodiment 1 in that the gate electrode extended forming the predetermined angle $\theta$ to the scanning line and the drain electrode and the source electrode are provided. In this embodiment, the drain electrode 5 is extended from the scanning line side in the gate electrode, having the third superposing portion 53 to be superposed on one portion of the gate electrode (the lower layer of the semiconductor layer 6, not shown) of the gate electrode, and at the same time, the source electrode 4 is extended onto the signal line side in the gate electrode, having the fourth superposing portion 54 to be superposing on one portion of the gate electrode, and the third superposing portion and the fourth superposing portion are formed in such a manner as to be point-symmetrical to each other with respect to a point on the central line (segment L) of the gate electrode in the predetermined angle $\theta$ direction.

Even when the alignment offset of the stepper is caused as in Embodiment 1 by provision of the drain electrode and the source electrode, the brilliance as the region to be formed by a plurality of pixels hardly changes as compared with a case where the alignment offset is not caused. It can be controlled that the brilliance difference between the divided exposure regions are caused, whereby the liquid crystal display apparatus which is superior in the display quality can be obtained without reduction in the pixel aperture ratio.

In the aforementioned Embodiments 1 and 2, an example of the pixel where a storage capacitance wiring is provided. The same effect is obtained even in the pixel where the storage capacitance is formed between the adjacent gate line and the pixel electrode without the storage capacitance wiring. It can be applicable even in the formation of the storage capacitance based on the common CS construction and in the formation of the storage capacitance based on the CS on gate construction, whereby the same effects can be obtained. The same effects are obtained even about the etching stopper type TFT. The angle $\theta$ of the scanning line and the gate electrode can use any value from 0° to 90°, and the TFT can be provided in accordance with the direction of the angle $\theta$. The present invention can be applicable even to the liquid crystal display apparatus of an IPS system where an voltage is applied between two electrodes formed on the array substrate, an electric field is caused in almost level portion to the substrate face to drive the liquid crystal molecule within the surface, whereby the same effects are obtained.

As described above, by such construction that the fluctuations of the Cgd to be caused by the alignment offset may be caused in the opposite direction among the adjacent pixels according to the present invention, the brilliance difference for causing the fluctuations of the Cgd is averaged apparently, whereby the brilliance difference among the divided exposure regions can be controlled. As a result, a liquid crystal display apparatus which is superior in display quality without reduction in the pixel aperture ratio can be provided in mass production.

What is claimed is:

1. A liquid crystal display apparatus comprising:
    a first pixel including a gate electrode of a first transistor extended forming a predetermined oblique angle $\theta$ to the scanning line;
    a drain electrode of the first transistor having a portion to be superposed on the gate electrode provided in a first predetermined region on the signal line side in the gate electrode;
    a source electrode of the first transistor provided in a second predetermined region opposite to the drain electrode in the gate electrode in the first predetermined region;

a second pixel including a gate electrode of a second transistor extended forming the predetermined oblique angle θ to the scanning line;

a source electrode of the second transistor provided in a third predetermined region on the signal line side in the gate electrode; and a drain electrode of the second transistor having a portion to be superposed on the gate electrode provided in a fourth predetermined region opposite to the source electrode in the gate electrode in the third predetermined region.

2. The liquid crystal display apparatus of the claim 1, wherein a brilliance of the apparatus is controlled in the first predetermined region by the gate electrode and the signal line, in the second predetermined region by the gate electrode and the scanning line, in the third predetermined region by the gate electrode and the signal line, and in the fourth predetermined region by the gate electrode and the scanning line.

3. The liquid crystal display apparatus of the claim 1, wherein the first pixel and the second pixel are adjacent to each other and the first pixel and the second pixel are positioned by plurality in the arrayed condition.

4. The liquid crystal display apparatus of the claim 1, wherein the area of the portion where the gate electrode and the drain electrode are superposed in the first pixel is the same as that of the portion where the gate electrode and the drain electrode are superposed in the second pixel.

5. The liquid crystal display apparatus of the claim 1, wherein the value of Cgd in the first pixel is the same as that of the Cgd in the second pixel.

6. The liquid crystal display apparatus of the claim 1, wherein the storage capacitance is formed by the pixel electrode and the gate electrode to be included in the first pixel, and the storage capacitance is formed by the second pixel and the electrode gate electrode to be included the second pixel.

7. A liquid crystal display apparatus comprising:

a first pixel wherein a gate electrode of a first transistor extended forming a predetermined oblique angle θ to the scanning line; said first pixel including a drain electrode of the first transistor being extended from the signal line side in the gate electrode, said drain electrode having a first superposing portion to be superposed on the one portion of the gate electrode; and a source electrode of the first transistor being extended from the scanning line side in the gate electrode, said source electrode having a second superposing portion to be superposed on the one portion of the gate electrode, said first superposing portion and said second superposing portion being formed spot-symmetrical in one point on the central line of the gate electrode in the direction of the predetermined oblique angle θ; and a second pixel wherein a gate electrode of a second transistor is extended forming a predetermined oblique angle θ to the scanning line; said second pixel including a drain electrode of the second transistor being extended from the scanning line side in the gate electrode, said drain electrode having a third superposing portion to be superposed on one portion of the gate electrode; and a source electrode of the second transistor is extended from the signal line side in the gate electrode; said source electrode having a fourth superposing portion to be superposed on one portion of the gate electrode; said third superposing portion and said fourth superposing portion being formed in such a manner as to be point-symmetrical to each other with respect to a point on the central line of the gate electrode in the direction of the predetermined oblique angle θ.

8. The liquid crystal display apparatus of claim 1, wherein the predetermined angle θ being in an inclusive range of values greater than 0° through values to 90°.

9. The liquid crystal display apparatus of claim 7, wherein the predetermined angle θ being in an inclusive range of values greater than 0° through values to 90°.

* * * * *